March 20, 1962  R. E. HARRIS  3,026,404
RESISTANCE WELDING MACHINE
Filed Aug. 31, 1959  4 Sheets-Sheet 3
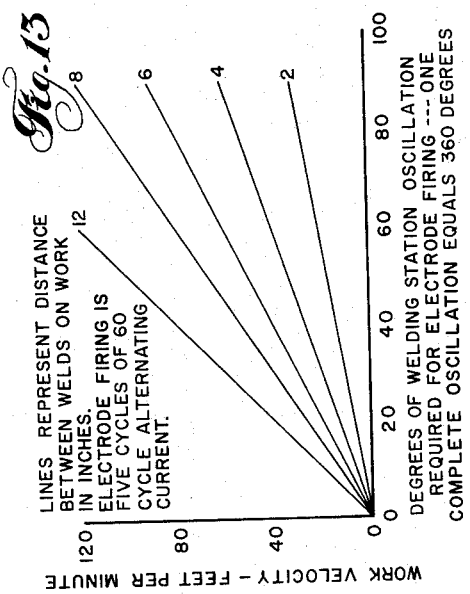
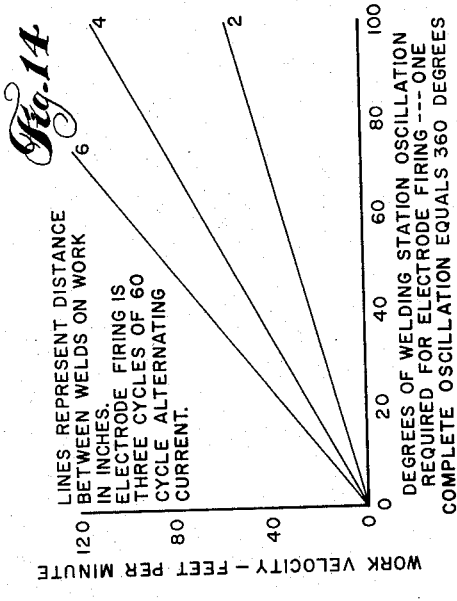
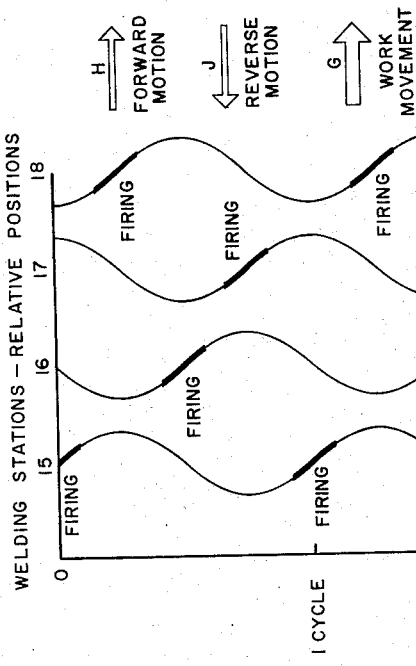
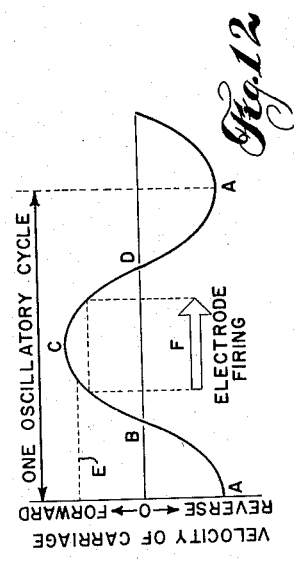
INVENTOR.
ROBERT E. HARRIS
BY
Harry B. Keck
ATTORNEY

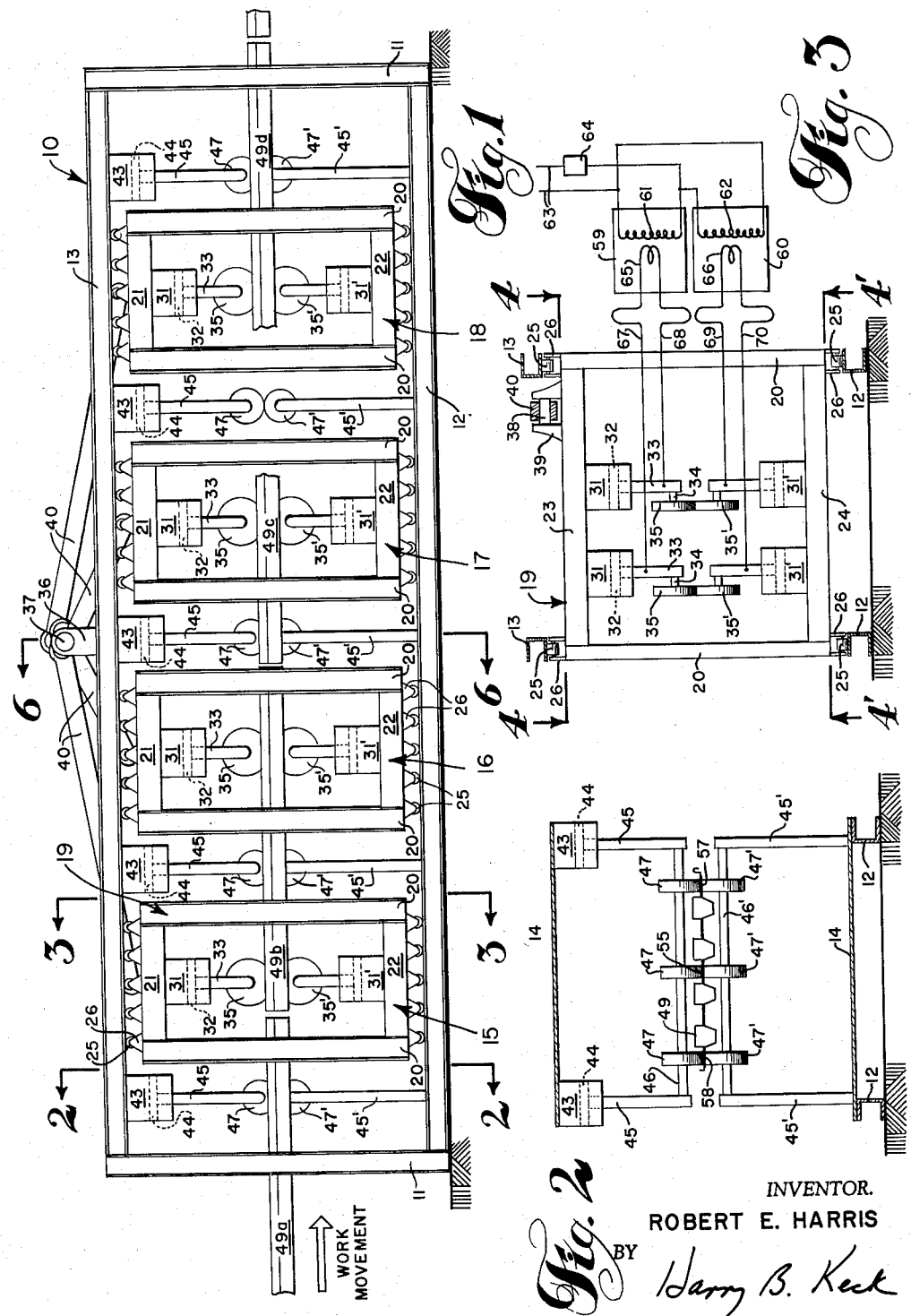

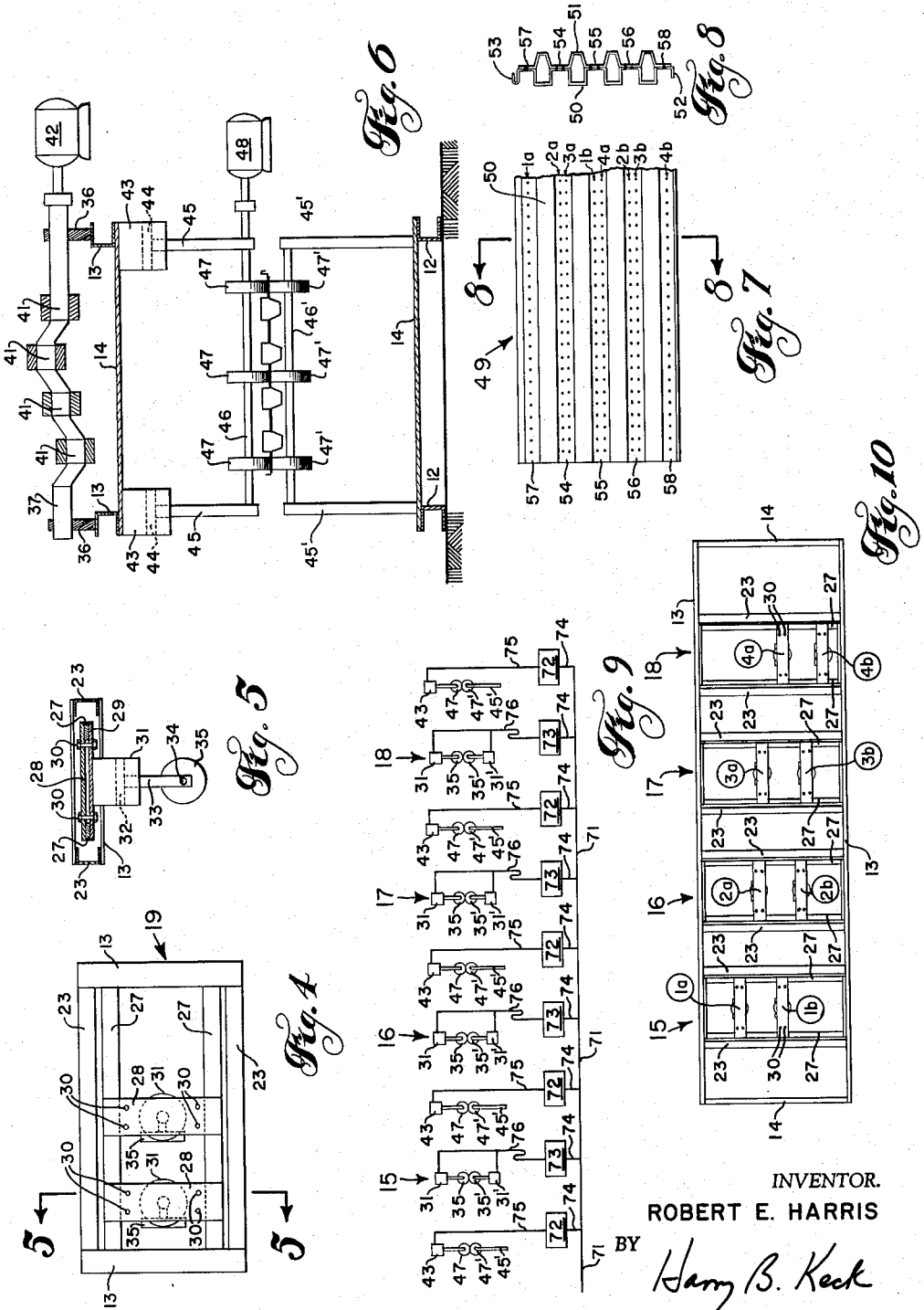

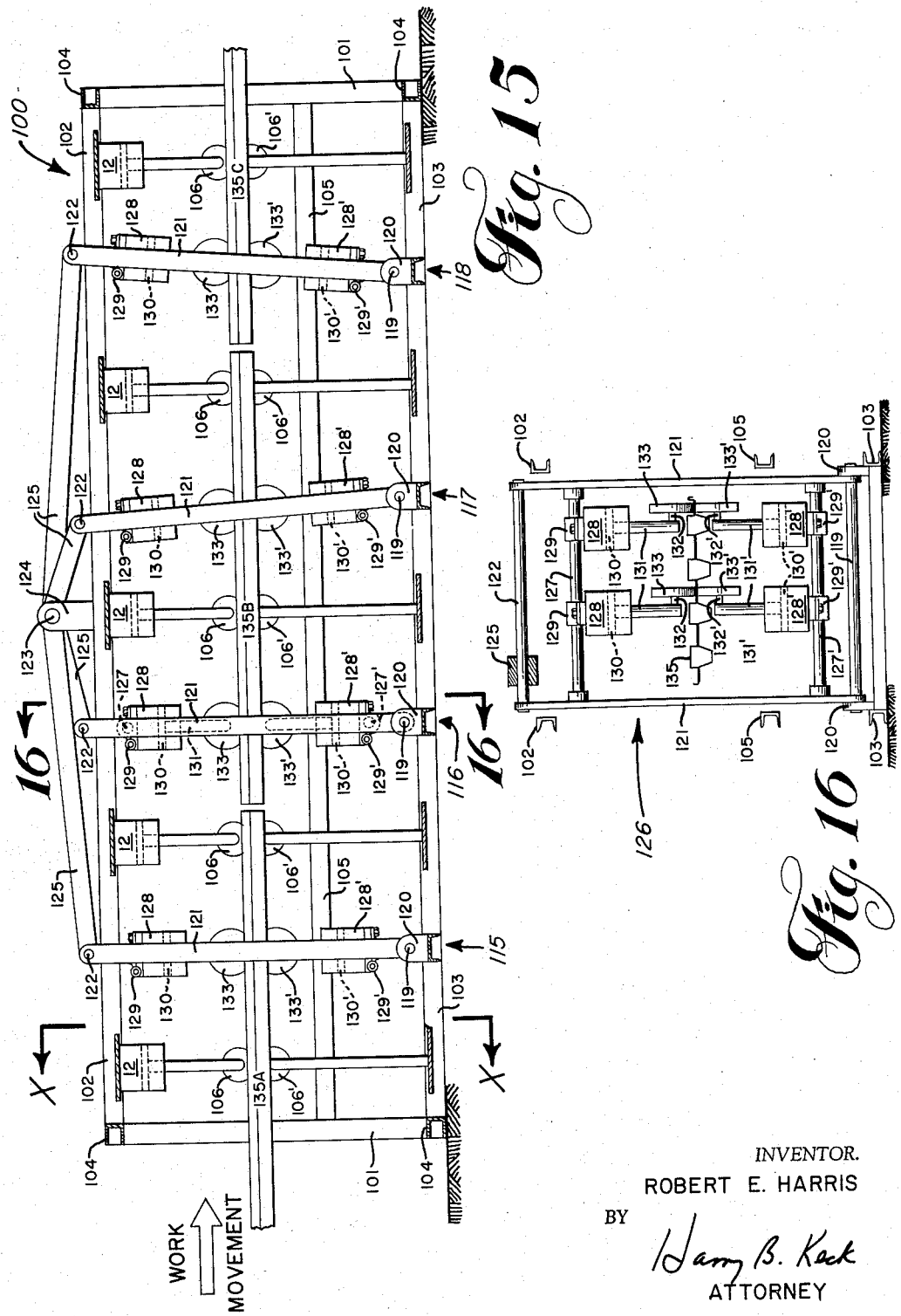

United States Patent Office 3,026,404
Patented Mar. 20, 1962

3,026,404
RESISTANCE WELDING MACHINE
Robert E. Harris, Pittsburgh, Pa., assignor to
H. H. Robertson Company
Filed Aug. 31, 1959, Ser. No. 837,116
19 Claims. (Cl. 219—81)

The present invention relates to a resistance welding machine and a method of resistance welding. More particularly this invention relates to a method and apparatus for providing spaced resistance welds along a plurality of straight lines to secure abutting metal sheets which are moving in fixed relation to one another along a conveyer line.

Frequently it is desirable to fasten together two or more flat metal sheets by means of a number of resistance welds. Particularly in the manufacture of cellular floor, for example, as shown in U.S. Patent 1,867,433, two elongated rectangular metallic sheets are welded together. In cellular floor sections, at least one of the two metal sheets has corrugations such that the two sheets are in contact only between the corrugations. Resistance welds are required in those portions of the two metal sheets which are in contact. Such welds are placed in straight lines between adjacent corrugations. The spacing between such resistance welds has some relation to the ultimate strength of the resulting cellular metal floor.

Hitherto such resistant welding of cellular metal flooring has occurred by advancing the top and bottom metal sheets in fixed relation along a conveyer line to one or more welding stations. For each resistance weld or series of welds, the metal sheets are stopped in motion, welding electrodes are advanced toward each sheet, and electrical welding current is passed through the welding electrodes for a predetermined time (usually a fraction of a second); the welding electrodes are withdrawn and the work advances several inches to the next weld position where the cycle is repeated. Each of the unit operations requires a finite time. As a result the over-all movement of the metal sheets along the conveyer line is relatively slow. The work must be stopped and started for every resistance weld or series of resistance welds.

The object of the present invention is to provide a method and apparatus for resistance welding of metal sheets such as cellular metal flooring which will operate while the metal sheets are moving uninterruptedly along a conveyer line at speeds hitherto unrealized. Work speeds of 50 to 100 feet per minute can be achieved by the method and apparatus of the present invention. Greatly increased production results.

By way of illustration, consider two metal sheets advancing along a conveyer line at a rate of 60 feet per minute. This velocity corresponds to one foot per second. In the usual electrical resistance welding, a burst of high amperage alternating current is passed between resistance electrodes for three to five cycles of the usual sixty cycle (per second) alternating current. This corresponds to a current flowing time of $\frac{1}{20}$ to $\frac{1}{12}$ second. The metal sheets, during that period of time, would move from 0.6 to 1 inch. With such work movement relative to the electrodes, a suitable resistance weld cannot be obtained because the burst of electrical current is not confined to a spot on the work. To achieve a suitable resistance weld, the electrodes must be maintained in substantially static contact for the aforementioned three to five cycles of the usual sixty cycle alternating current.

According to the present invention I provide a pair of wheel electrodes, spaced one above and one below a conveyer line along which the metal sheets are moved at an uninterrupted velocity. During operation the wheel electrodes at all times are in contact with the moving metal sheets. The pair of wheel electrodes is caused to oscillate in a forward and reverse direction along the conveyer line. As the wheel electrodes are moving in a forward direction, they are moving in the same direction as the metal sheets. As the wheel electrodes are moving in a reverse direction, they are moving in the opposite direction from that of the metal sheets. During at least a portion of the forward movement of the wheel electrodes, they are advancing at substantially the same speed as the metal sheets. Thus, during this portion of the forward movement of the wheel electrodes, there is substantially no relative motion between the wheel electrodes and the metal sheets. As electrical welding current is caused to pass between the wheel electrodes through the metal sheets during a portion of the forward movement wherein the wheel electrodes are advancing at substantially the same velocity as the metal sheets, a satisfactory weld is achieved by the electrode pair during each forward movement. Each pair of wheel electrodes thus will provide a single straight line of satisfactory resistance welds. Where more than one line of resistance welds is required, more than one pair of wheel electrodes is employed.

In order to avoid severe vibrational stresses in the building where the welding machine is located, I prefer to employ pairs of integrated welding stations, each station including at least one pair of wheel electrodes. Each welding station of a pair of welding stations moves in a direction opposite to that of the other station of the same pair. Thus when one welding station of a pair is moving in a forward direction, the other welding station of the same pair is moving in a reverse direction and vice versa. The vibration stresses of welding station oscillation thereby offset and no resultant unbalanced forces are generated in the welding apparatus.

In a further refinement of the present invention I employ four welding stations. That is, there are two pairs of welding stations. Each of the welding stations follows the same oscillatory movement in sequence whereby no more than one of the welding stations is moving in a forwardly direction at substantially the speed of movement of the metal sheets at any instant. Thereby welding electrical current is drawn from an electrical source for only one of the four welding stations at any given instant. The maximum instantaneous electrical current requirement from the entire welding apparatus thus is no greater than the maximum instantaneous electrical current requirement for any one of the four welding stations.

In one embodiment of the invention, the welding stations may be oscillated longitudinally along the line of the work conveyer. In another embodiment, the welding stations may be pivoted about a shaft transverse to the conveyer line whereby the welding wheels oscillate substantially horizontally as the station oscillates about the pivot shaft.

The principal object of this invention is to provide a method and apparatus for welding together metal sheets while they are moving uninterruptedly along a conveyer line.

A further object of this invention is to provide a welding method and apparatus which will provide spaced resistance welds along one or more straight lines to fasten together two or more metal sheets at production rates hitherto unrealized.

Another object of this invention is to provide a welding method and apparatus for fastening together two or more metal sheets by means of resistance welds having a geometrical uniformity of appearance.

A still further object of this invention is to provide a method and apparatus for fabricating cellular metal floor at production rates hitherto unrealized.

These and other objects and advantages of the present invention will become apparent from the following detailed description by reference to the accompanying drawings in which:

FIGURE 1 is a side elevation illustrating schematically one embodiment of a welding apparatus according to the present invention;

FIGURE 2 is a cross-section drawing taken along the line 2—2 of FIGURE 1 illustrating pairs of pinch rolls;

FIGURE 3 is a cross-section view taken along the line 3—3 of FIGURE 1 illustrating a single welding station and electrical connections;

FIGURE 4 is a plan view of a single welding station taken along the line 4—4 of FIGURE 3 illustrating adjustment features which introduce versatility into the present apparatus;

FIGURE 5 is a cross-section view taken along the line 5—5 of FIGURE 4 illustrating a typical wheel electrode in the present invention;

FIGURE 6 is a cross-section view taken along the line 6—6 of FIGURE 1 illustrating drive means for the welding station oscillation and pinch rolls;

FIGURE 7 is a plan view of a typical cellular metal floor section representing a preferred form of work to which the present invention is applicable;

FIGURE 8 is a cross-section view of the cellular metal floor taken along the line 8—8 of FIGURE 7;

FIGURE 9 is a schematic illustration of a pneumatic or hydraulic control system for the electrodes and pinch rolls of the present apparatus;

FIGURE 10 is a plan view illustrating schematically the preferred relative lateral positions of wheel electrodes in each of the welding stations for producing the cellular metal floor of FIGURES 7 and 8;

FIGURE 11 is a graphical representation of the relative positions of each of four welding stations over several oscillatory cycles;

FIGURE 12 is a graphical illustration of the instantaneous velocity of a single welding station according to the present invention from which certain principles will be explained;

FIGURES 13 and 14 are graphical illustrations of the interrelation of certain operating variables which will be described;

FIGURE 15 is a side elevation view of a preferred embodiment of apparatus adapted to practice the present welding method; and FIGURE 16 is a cross-section view taken along the line 16—16 of FIGURE 15 illustrating one welding station according to the preferred embodiment.

Referring to the drawings, and particularly to FIGURES 1 through 6, present apparatus comprises a frame 10 which may be formed from channel sections including vertical members 11, a bottom member 12 and a top member 13. Suitable cross members 14 may be provided. The upper surface of the bottom member 12 and the lower surface of the top member 13 form rails against which the welding stations are oscillated.

An even number of welding stations 15, 16, 17 and 18 are mounted within the frame 10 as will be described. Each of the welding stations 15, 16, 17 and 18 has a frame 19 which may be formed from channel sections having vertical members 20, top members 21 and bottom members 22. Top cross members 23 and bottom cross members 24 are provided to complete the frame 19.

A plurality of rollers 25 are mounted in journals 26 which are secured to the top members 21 and bottom members 22. The rollers 25 are in rolling contact with the rail surfaces formed by the upper surface of the bottom member 12 and the lower surface of the top member 13. Thus the entire welding station 15 is longitudinally slidable relative to the machine frame 10.

Between the cross members 23 are mounted parallel cross rails 27. Parallel plates 28 and 29 are secured respectively above and below the cross rails 27 by means of bolts 30. By loosening the bolts 30, the upper and lower parallel plates 28 and 29 are free to slide along the cross rails 27. The bolts 30 permit fastening of the upper and lower plates 28 and 29 in any desired position along the cross rails 27.

Secured to the lower plate 29 is a fluid cylinder 31 having a vertical bore. A hydraulic piston 32 having a piston rod 33 is slidably mounted within the bore of the hydraulic cylinder 31. The piston rod 33 has a stub axle 34 to which a wheel electrode 35 is rotatably attached. By introducing hydraulic or pneumatic fluid into the bore of the fluid cylinder 31 above the hydraulic piston 32, the wheel electrode 35 may be caused to descend.

The lower structure in each of the welding stations 15, 16, 17 and 18 corresponds to the upper structure. Accordingly the drawing in FIGURE 4, while described as a section taken along the line 4—4 of FIGURE 3 is similar to a section taken along the line 4'—4' of FIGURE 3. For simplicity, the corresponding elements of the lower structure whose identification is required will be indicated by prime numerals hereinafter.

Introduction of pressurized fluids, liquid or gaseous, into the fluid cylinders 31 and 31' causes the pair of wheel electrodes to approach one another. By providing a common source of pressurized fluid for the fluid cylinders 31 and 31', the two wheel electrodes exert equal and opposite pressure, compress metal sheets between them and assure satisfactory welds.

Each of the welding stations 15, 16, 17 and 18 is constructed similarly.

The drive means for oscillating the welding stations 15, 16, 17 and 18 will now be described. A pair of journals 36 is mounted above the top members 13 of the frame 10. A crankshaft 37 is rotatably mounted within the journals 36. Each of the welding stations 15, 16, 17 and 18 has a circular shaft 38 mounted in journals 39 which are secured to a top cross member 23 (see FIGURE 3). Crank arms 40 extend from eccentric shafts 41 on the crankshaft 37 to a circular shaft 38 for each of the welding stations 15, 16, 17 and 18. Drive means such as a motor 42 are provided to rotate the crankshaft 37. Rotation of the crankshaft 37 causes the eccentric shafts 41 to revolve about the axis of the crankshaft 37 generating a simple harmonic motion in the crank arms 40. The simple harmonic motion is transferred to the circular shaft 38 from the crank arms 40 causing the frame 19 of each welding station to oscillate in a forward and reverse direction with respect to the frame 10. The eccentric shafts 41 are displaced by 90 angular degrees whereby the simple harmonic oscillation of each of the welding stations 15, 16, 17 and 18 lags that oscillation of another by 90 degrees (of a 360 degree harmonic oscillation).

In order to drive metal sheets through the present apparatus, a plurality of driven pinch rolls are provided on each side of each of the welding stations 15, 16, 17 and 18. The pinch rolls will be described by reference to FIGURES 1, 2 and 6.

Lower pinch rolls are securely mounted at a height determined by the conveyer line which carries the work pieces. Upper pinch rolls are adjustable vertically to permit control over the pressure exerted against the work pieces at the hip of the pinch rolls.

A pair of fluid cylinders 43 having a vertical bore is mounted to a cross member 14 extending between the top members 13 of the frame 10. A hydraulic piston 44 having a piston rod 45 is slidably mounted in each of the bores of the fluid cylinders 43. A rotatable shaft 46 is rotatably mounted through openings at the extremities of the piston rods 45. One or more pinch rolls 47 is secured to the rotatable shaft 46. By suitable keying or splining, the pinch rolls 47 can be securely positioned at any desired point along the length of the rotatable shaft 46 to correspond to abutting metal surfaces of the work being processed. Drive means such as a motor 48 are provided to rotate the rotatable shaft 46 causing rotation of the pinch rolls 47.

Lower pinch rolls 47' are mounted on a rotatable shaft 46' which is mounted within the frame 10 upon fixed vertical support rods 45'.

Introduction of hydraulic fluid into the fluid cylinder 43 above the hydraulic piston 44 causes the pinch rolls 47 to descend. The pinch rolls 47 and 47' are in peripheral opposition. A desirable static pressure can be exerted between the pinch rolls 47 and 47' by means of the fluid piston 44 and cylinder 43. Rotation of one or both of the rotatable shafts 46 and 46' causes a forward movement of a work piece by virtue of opposed peripheral frictional engagement of the work piece.

A typical work piece is illustrated in FIGURES 7 and 8 comprising a cellular floor section 49 which includes a channeled upper metal sheet 50 and a channeled lower metal sheet 51. Occasionally only one of the two metal sheets 50 or 51 is channeled or corrugated; the other metal sheet may be flat. The two metal sheets 50 and 51 are in abutment between the channels and are secured in their abutting portions by means of resistance welds. Interlocking male and female lip members 52 and 53 respectively frequently are provided to facilitate interlocking engagement of the product cellular floor sections.

In the four-celled cellular floor section of FIGURES 7 and 8 there are five abutting metal portions 54, 55 and 56 which are spaced between cells, and 57 and 58 which are outside the end cells.

The pinch rolls 47 and 47' peripherally frictionally engage abutting metal sheets, for example, as shown in FIGURE 2, along the abutting portions 55, 57, 58.

Referring once more to FIGURE 1, a constant stream of aligned metal sheets forming cellular floor sections 49A (fragmentary), 49B, 49C (frgamentary) and 49D (fragmentary) moves through the welding apparatus under the influence of driving pinch rolls 47 and 47'. Desirably the abutting metal sheets which form a cellular floor section are preliminarily tack welded in alignment at several spots to maintain them in fixed relation during their movement along the conveyer line. The pinch rolls 47 and 47' apply abutting pressure to the cellular floor sections by virtue of fluid pressure exerted in the fluid cylinders 43. The cellular floor sections advance uninterruptedly through the welding machine at linear velocities as high as 50 to 100 feet per minute. Opposed wheel electrodes 35 and 35' are maintained in peripheral contact with abutting portions of the metal sheets in process, that is, abutting portions 54, 55, 56, 57 and 58 of the cellular floor sections 49A, 49B, 49C and 49D. Each of the welding stations 15, 16, 17 and 18 is in continuous oscillating movement in alternating forward and reverse directions as the welding stations 15, 16, 17 and 18 move from left to right (FIGURE 1). During oscillatory movement of the welding stations 15, 16, 17 and 18, some portion of that movement occurs from left to right at substantially the speed of uninterrupted work movement from left to right. During this period the wheel electrodes 35 and 35' exhibit virtually no movement relative to the advancing work 49A, 49B, 49C and 49D. During reverse movement of the welding stations 15, 16, 17 and 18, the wheel electrodes 35 and 35' move from right to left (FIGURE 1) in a direction opposite to that of work movement. During this portion of oscillatory motion, the wheel electrodes 35 and 35' roll over the abutting metal sheets of the work.

According to the well known principles of simple harmonic motion, the displacement of the welding stations 15, 16, 17 and 18 follows a sinusoidal pattern and the velocity of oscillatory movement is derivative of the sinusoidal pattern, i.e., a cosine pattern. Thus the velocity in a forward direction is a maximum when the oscillating structure passes through the mid-point of its oscillatory movement. Similraly the velocity is zero as the oscillating structure passes through its point of maximum displacement in each direction.

A cosine curve is plotted in FIGURE 12 illustrating the variation in velocity of the oscillating structure during one complete oscillatory cycle. At the points A, the oscillating structure is passing through its mid-point in a reverse direction. At the point B, the oscillating structure ceases to move in reverse and commences to move in a forward direction. At the point C, the oscillating structure passes through its mid-point in a forwardly direction and its forward velocity is a maximum. At the point D, the oscillating structure ceases to move in a forward direction and reverses its movement; the velocity at this point is zero. Thus the velocity of the oscillating structure varies cyclically from a maximum in a reverse direction to a maximum in a forward direction and so forth.

As heretofore stated, the velocity of the work in process is constant and uninterrupted in a forward direction. The work velocity has a value which can be graphically expressed by the line E in FIGURE 12, related to the vertical axis.

The required frequency of oscillatory movement can be determined by the frequency of resistance welds required of each welding station 15, 16, 17 and 18. This frequency determines the time span of one complete oscillatory cycle as indicated in FIGURE 12. For example, where the work movement proceeds at 60 feet per minute, corresponding to one foot per second, and it is desired to space resistance welds every six inches along the work in process, it follows that two welds must be made every second. Accordingly the time span of one complete oscillatory cycle would be one-half second. In other words each of the welding stations 15, 16, 17 and 18 would be required to make two complete oscillations every second in the described situation.

The required amplitude of each oscillation is determined such that the maximum velocity represented by the point C (FIGURE 12) is about the same as, but preferably slightly greater than the work velocity represented by the line E. The peak-to-peak amplitude of welding station oscillation in the previous example would be about 1.6 inches where a suitable weld can be achieved with a burst of electrical welding current of three cycles duration from a sixty-cycle alternating current source, that is in about $\frac{1}{20}$ second. During the $\frac{1}{20}$ second, the average velocity of the welding station in a forward direction is substantially the same as that of the work movement. The arrow F (FIGURE 12) graphically illustrates the portion of oscillatory cycle during which actual firing occurs. Thus, during actual electrode firing, there is substantially no relative motion of the welding electrode relative to the uninterruptedly advancing work.

The electrical connections illustrated in FIGURE 3 will now be described.

Separate transformers 59 and 60 have their primary coils 61 and 62 connected to a source 63 of alternating current electrical power. Suitable switch gear 64 is provided to connect the primary coils 61 and 62 for the desired time duration while the associated welding station is advancing at substantially the speed of work movement. Secondary coils 65 and 66 are connected through heavy flexible busbar conductors 67, 68, 69 and 70 to the wheel electrodes 35 and 35'. Since the transformers 59 and 60 are mounted independently of the oscillating weld stations 15, 16, 17 and 18, it is necessary that the busbar conductors 67, 68, 69 and 70 have flexible portions to accommodate the oscillatory movement of the welding stations. Note that the busbar conductors 67 and 68 from the transformer 59 are connected with upper wheel electrodes 35 whereas the busbar conductor 69 and 70 from the transformer 60 are connected with lower wheel electrodes 35'. The primary coils 61 and 62 are joined in opposite polarity whereby the familiar push-pull welding circuit results.

Any of a wide variety of timing devices can be employed to activate the electrical switch gear 64. Suitably a timing device mounted on the crankshaft 37 can be employed to activate the electrical switch gear 64 for each of the welding stations 15, 16, 17 and 18 during those periods when the forward movement of the welding stations is substantially the speed of work movement.

Where welding stations 15 and 16 are moving in opposite directions, welding stations 17 and 18 similarly will move in opposite directions and will lag by 90 degrees out of phase from welding stations 15 and 16.

The instantaneous displacement of the four welding stations 15, 16, 17 and 18 is illustrated in FIGURE 11 in a graphical manner. A vertical time axis is employed to spread out the motion. The arrow G in FIGURE 11 indicates the direction of work movement. The arrows H and J indicate respectively the forward and reverse motion exhibited by the welding stations during their simple harmonic oscillation. Note that welding stations 15 and 16 move in opposite directions in order to offset vibrational stresses. That is, when the welding station 15 is moving in a forward direction (arrow H) the welding station 16 is moving in a reverse direction (arrow J).

Similarly the welding stations 17 and 18 move in opposite directions. That is when the welding station 17 is moving in a forward direction (arrow H) the welding station 18 is moving in a reverse direction (arrow J). Note further that the welding stations 15 and 16 are 90 degrees out of phase from the welding stations 17 and 18.

Consider for a moment the oscillation of welding station 15 as represented graphically in FIGURE 11. The wheel electrodes in the welding station 15 are fired once for each complete oscillation of the welding station 15. The firing occurs as the welding station 15 passes through its mid-point in a forward direction (arrow H). At this portion of the oscillatory cycle, the welding station 15 is moving in a forwardly direction at substantially the same speed as that of the work in process. Firing is indicated in FIGURE 11 by a heavy line superimposed on the displacement curve. The indicated firing in FIGURE 11 corresponds to the indicated firing marked F in FIGURE 12. The firing sequence indicated in FIGURE 11 is as follows: 15, 18, 16, 17, 15, 18, 16, 17, etc. Note that no two of the welding stations are drawing electrode firing current at the same instant. Thus the maximum current drain from the source of electrical power is no greater at any instant than that drawn by a single welding station.

In order to achieve this result, it is necessary that each of the welding stations draw current for electrode firing for less than 90 degrees of each complete oscillation which equals 360 degrees.

FIGURES 13 and 14 graphically present the relationship between (A) the number of degrees of welding station oscillation required for electrode firing and (B) the work velocity in feet per minute for various desired weld spacing distances, i.e., frequency of welding. FIGURE 13 shows the relationship existing where the required electrode firing is five cycles of a sixty cycle alternating current source—that is one-twelfth of one second. FIGURE 14 shows the relationship where electrode firing is three cycles of a sixty cycle alternating current—that is one-twentieth of a second.

When four welding stations are employed, it is preferred to maintain the number of degrees of oscillation required for electrode firing at a value less than about 80 degrees. Thus, according to FIGURE 14, if the work velocity is 50 feet per minute, the minimum distance which can be achieved between welds is two inches, and preferably slightly more than two inches where it is desired to avoid instantaneous maximum electrical current at greater than the peak for one electrode station.

The hydraulic or pneumatic connections for the present apparatus are illustrated schematically in FIGURE 9. The welding stations 15, 16, 17 and 18 are schematically indicated showing the fluid cylinders 31 and 31'. The pinch roll fluid cylinders 43 also are indicated. A pressure fluid manifold 71 is connected to remote control valves 72 and 73 by means of connecting conduits 74.

The remote control valves 72 have conduit connections 75 leading to the fluid cylinders 43 which control the position and pressure of the pinch rolls 47. When the valves 72 are operated from a remote control point, the pinch rolls 47 can be caused to descend toward the fixed pinch rolls 47'.

Similarly the remote control valves 73 are connected to the fluid cylinders 31 and 31' by means of a connecting conduit 76. When the valves 73 are operated from a remote control point, the electrode wheels 35 and 35" are caused to approach or separate. Note that both of the fluid cylinders 31 and 31' are connected to the same conduit 76 so that an equal pressure is applied to the electrode wheels 35 and 35'. Satisfactory resistance welding requires that the metal sheets which are being joined shall be maintained in tight contact. Suitable pressure to assure the desired contact can be applied through the fluid pressures in the fluid cylinders 31 and 31'.

Where it is desired to operate less than all of the welding stations 15, 16, 17 and 18, one or more pairs of opposed electrode wheels 35 and 35' may be removed from service by a machine operator at a remote control point. Similarly one or more pairs of opposed pinch rolls 47 and 47' may be removed from service by an operator at a remote control point.

The relative positioning of the wheel electrodes in each of the welding stations 15, 16, 17 and 18 will now be described for a typical application. Referring to FIGURES 7 and 8, it is seen that a single line of spaced resistance welds is required in the abutting metal portions 57 and 58 outside the end cells of the cellular floor section 49. Two straight lines of spaced resistance welds are required in the abutting metal portions 54, 55 and 56 between the cells. Thus a total of eight lines of spaced resistance welds is required. Each of the welding stations conveniently can provide two lines of resistance welds. The relative lateral spacing of the electrode wheels is accomplished as already described by loosening the bolts 30 (FIGURES 4 and 5) and sliding the parallel plates 28 and 29 to the desired transverse position with respect to the cross rails 27. A preferred arrangement for welding the cellular floor section of FIGURES 7 and 8 is shown schematically in plan view in FIGURE 10. The welding wheels of welding station 15 are identified as 1—a and 1—b. The welding wheels of welding station 16 are identified as 2—a and 2—b. The welding wheels of welding station 17 are identified as 3—a and 3—b. The welding wheels of welding station 18 are identified as 4—a and 4—b. In the positions shown in FIGURE 10, the welding wheel 1—a will provide the line of welds indicated as 1—a in FIGURE 7. The welding wheel 1—b will provide the line of welding indicated by 1—b in FIGURE 7. Similarly the other identified welding wheels of FIGURE 10 will provide the correspondingly indicated lines of welds in FIGURE 7.

Note that in the preferred welding wheel positioning of FIGURES 7 and 10, each single welding station completes two weld lines which are separated by two channels of the cellular floor 49. Heat dissipation is improved and electrical dissipation is minimized in the indicated positioning.

While I have shown each of the welding stations 15, 16, 17 and 18 as equipped with two pairs of welding wheel electrodes, it is apparent that each station could be provided with one, two, three or as many welding wheel electrodes as the machine geometry will accommodate. The versatility of positioning the welding wheels in each welding station permits the machine to be used for a variety of product shapes. Vertical and lateral adjustability of the welding wheel electrodes is available. Similarly vertical and lateral adjustability of the pinch rolls 47 is available. While I have illustrated three pinch rolls 47 on the rotating shaft 46, it should be apparent that one, two, three or more than three such pinch rolls may be provided.

While the actual electrical structure of the welding machine forms no part of the present invention, I prefer to employ alternating current of a predetermined number of cycles to achieve resistance welds. Welding currents of the order of several thousand amperes up to about thirty thousand amperes are envisioned. Such values are in accordance with customary procedures. It is also possible in the present invention to avoid alternating current and employ, instead, direct current via suitable condensers according to conventional welding techniques.

The important feature in the present invention is the provision of means for oscillating wheel electrodes in a forward and reverse direction in a straight line over continuously uninterruptedly moving work and to offset the reactive forces of such oscillations by operating welding stations in pairs moving in opposed directions.

A preferred embodiment of apparatus adapted to practice the present invention is illustrated in FIGURES 15 and 16. In the preferred embodiment of the apparatus, each welding station comprises a pivotal structure in which one or more pairs of opposed welding wheel electrodes are mounted in opposition. Instead of the rectilinear oscillation presented by the structure of FIGURE 1, a pivotal oscillation is provided. It is necessary that sufficient distance be provided between the pivot shaft and the juncture of each pair of opposed welding wheel electrodes so that the movement of that juncture along the circular arc of the pivot distance be substantially linear.

A frame 100 is formed from vertical elements 101, upper horizontal elements 102, lower elements 103 and cross members 104. Additional support elements 105 may be provided if required for structural strength. Pinch rolls 106 and 106' are provided in a manner similar to that already described in FIGURE 2. A cross-section taken along the line X—X of FIGURE 15 would correspond to FIGURE 2.

Four welding stations are presented in FIGURE 15 identified as 115, 116, 117 and 118. For each welding station, a circular shaft 119 is provided extending between journals 120 secured to the lower structural elements 103. Vertical members 121 are pivotally secured to the shaft 119 at one end and are joined at their upper end to a circular shaft 122. A crankshaft 123 is rotatably mounted in journals 124 secured to the upper horizontal frame element 102. The crankshaft 123 corresponds to the crankshaft 37 seen in FIGURES 1 and 6 to the extent that it possesses four eccentric shafts which direct oscillatory movement of each welding station. Four crank arms 125 extend from the crankshaft 123 to the circular shaft 122 for each of the welding stations. The harmonic motion of the eccentric crankshaft 123 is transferred through the crank arms 125 to each welding frame causing each frame to oscillate pivotally about its shaft 119. Each welding station frame is identified by the numeral 126 and includes the vertical members 121 and the horizontal shafts 119 and 122.

Cross members 127 and 127' are provided between the vertical members 121 to add rigidity to the frame 126 and to provide a base for adjustably mounting fluid cylinders 128 and 128'. Pillow blocks 129 and 129' permit the fluid cylinders 128 and 128' to be fastened at any desired position along the length of the cross members 127 and 127'. Pistons 130 and piston rods 131 are associated with the fluid cylinders 128. A stub axle 132 at the lower end of the piston rod 131 rotatably supports a welding wheel electrode 133. Similarly pistons 130' and piston rods 131' are associated with the fluid cylinders 128'. A stub axle 132' at the upper end of the piston rod 131' rotatably supports a welding wheel electrode 133'.

Introduction of pressurized liquids or gases into the fluid cylinders 128 and 128' causes the welding wheel electrodes 133 and 133' to approach one another. If desired, additional supporting and alignment structure may be provided to assure linear movement of the piston rods 131 and 131'.

Work pieces 135, 135A, 135B, 135C pass uninterruptedly through the structure of FIGURES 15 and 16 between pinch rolls 106 and 106' and between welding wheel electrodes 133 and 133' in the direction indicated by the arrow labeled WORK MOVEMENT in FIGURE 15. It will be noted that the welding stations 117 and 118 are in their extreme separated positions whereas the welding stations 115 and 116 are at about the midpoint of their excursion. The welding stations 117 and 118 move in opposite directions at all times to offset the forces of movement. Similarly at all times the welding stations 115 and 116 move at all times in opposite directions for the same reason. Since the welding stations 117 and 118 have reached the ends of their excursions, the welding stations 115 and 116 are moving at their maximum velocity in the direction of greater separation. That is, welding station 115 is moving from right to left whereas welding station 116 is moving from left to right. Hence the welding station 116 is the only activated station in the system where electric welding current is passing between its wheel electrodes 133 and 133' through the work piece 135B. When the welding station 116 has completed its weld, the next activated welding station will be 117 as it passes through the midpoint of its excursion from left to right in the direction of work movement.

While I have illustrated in FIGURES 15 and 16 a preferred embodiment of this invention wherein each individual welding station exhibits a pivotal motion about a pivot point beneath the moving work pieces, it should be apparent that the pivot point could be positioned above the moving work pieces if desired.

In the embodiment illustrated in FIGURES 15 and 16 it is essential that the distance between the moving work pieces 135 and the pivot shaft 119 be sufficient that the pivotal oscillation of the wheel electrodes 133 and 133' has only little vertical movement. Where, for example, the distance between pivot shaft 119 and work pieces 135 is about five feet, then the arc excursion of several inches which is contemplated in the present invention will have only a negligible vertical component.

According to the provisions of the patent statutes, I have explained the principle, preferred embodiment and mode of operation of my invention and have illustrated and described what I now consider to represent its best embodiment. However, I desire to have it understood that, within the scope of the appended claims, the invention may be practiced otherwise than as specifically illustrated and described.

I claim:

1. A welding machine for providing a plurality of spaced resistance welds through abutting metal sheets along a straight line while said metal sheets move uninterruptedly in fixed relation to each other along a conveyer line, said machine comprising at least one welding station including a plurality of pairs of opposed wheel electrodes, each electrode being adapted to be in peripheral contact with one of said metal sheets, means for oscillating said pair of electrodes alternately in a forward and reverse direction along said straight line whereby at least a portion of the forward electrode movement occurs at substantially the speed of movement of said metal sheets, support means for guiding said metal sheets in uninterrupted movement through said machine, and means for firing said pairs of electrodes solely during said portion of the forward electrode movement.

2. A welding machine of claim 1 wherein the means for firing each pair of electrodes comprises an electrical firing circuit including at least two of said pairs of electrodes connected in electrical series relation.

3. A welding machine for providing a plurality of spaced resistance welds through abutting metal sheets along a plurality of straight, parallel lines while said metal sheets move uninterruptedly in fixed relation to each other along a conveyer line, said machine comprising a first welding station and a second welding station, each welding station including at least one pair of opposed wheel electrodes, each electrode being adapted to be in peripheral contact with one of said metal sheets, means for oscillating said first and second welding stations in opposed directions whereby each of said welding stations moves alternately in a forward and a reverse direction parallel to said straight, parallel lines and whereby at least a portion of the movement in a forward direction occurs substantially at the speed of movement of said metal sheets, at least one of said pairs of electrodes in each station being positioned in alignment with one of said straight, parallel lines, support means for guiding said metal sheets in uninterrupted movement through said machine, and means for firing said pairs of electrodes solely during said portion of the movement in a forward direction.

4. The welding machine of claim 3 wherein said first and second welding stations oscillate in simple harmonic motion 180 degrees out of phase with each other.

5. The welding machine of claim 3 wherein the means for oscillating said first and second welding stations includes a rotatable cam shaft having diametrically opposed cams and having a crank arm extending in driving relation from each cam to one of said welding stations.

6. A welding machine for providing a plurality of spaced resistance welds through abutting metal sheets along a straight line while said metal sheets move uninterruptedly in fixed relation to each other along a conveyer line, said machine comprising at least one welding station having an integral frame through which said metal sheets may move, a plurality of pairs of opposed wheel electrodes secured respectively to the top and bottom of said frame, each electrode being adapted to be in peripheral contact with one of said metal sheets, means for oscillating said frame alternately in a forward and reverse direction along the path of movement of said metal sheets whereby at least a portion of the forward frame movement occurs at substantially the speed of movement of said metal sheets, support means for guiding said metal sheets in uninterrupted movement through said machine, and means for firing said pairs of electrodes solely during said portion of the forward frame movement.

7. A welding machine for providing a plurality of spaced resistance welds through abutting metal sheets along a plurality of straight, parallel lines while said metal sheets move uninterruptedly in fixed relation to each other along a conveyer line, said machine comprising a first welding station and a second welding station, each welding station having an integral frame through which said metal sheets may move, each frame having at least one pair of opposed wheel electrodes, one electrode of each pair being secured to the top and the other to the bottom of its respective frame, each electrode being adapted to be in peripheral contact with one of said metal sheets, means for oscillating said frames in opposed directions whereby each of said frames moves alternately in a forward and a reverse direction parallel to said straight, parallel lines and whereby at least a portion of the forward frame movement occurs substantially at the speed of movement of said metal sheets, at least one of said pairs of electrodes in each station being positioned in alignment with one of said straight parallel lines, support means for guiding said metal sheets in uninterrupted movement through said machine, and means for firing said pairs of electrodes solely during said portion of the forward frame movement.

8. The welding machine of claim 7 wherein the means for oscillating said frames includes a rotatable cam shaft having diametrically opposed cams and having a crank arm extending in driving relation from each cam to one of said frames. .

9. A welding machine for providing a plurality of spaced resistance welds through abutting metal sheets along a plurality of straight, parallel lines while said metal sheets move uninterruptedly in fixed relation to each other along a conveyer line, said machine comprising four aligned welding stations including a first welding station, a second welding station, a third welding station and a fourth welding station, each welding station including at least one pair of opposed wheel electrodes, each electrode being adapted to be in peripheral contact with one of said metal sheets, means for oscillating said welding stations in pairs in opposed directions whereby each of said welding stations moves alternately in a forward and a reverse direction parallel to said straight, parallel lines and whereby at least a portion of the movement in a forward direction occurs substantially at the speed of movement of said metal sheets, at least one of said pairs of electrodes in each station being positioned in alignment with one of said straight, parallel lines, support means for guiding said metal sheets in uninterrupted movement through said machine, and means for firing said pairs of electrodes solely during said portion of the movement in a forward direction.

10. The welding machine of claim 9 wherein two of said four welding stations oscillate in simple harmonic motion 180 degrees out of phase with each other and the remaining two of said four welding stations oscillate in simple harmonic motion 180 degrees out of phase with each other.

11. The welding machine of claim 9 wherein a first welding station oscilaltes in simple harmonic motion, a second welding station oscillates in simple harmonic motion lagging 90 degrees out of phase with said first station, a third welding station oscillates in simple harmonic motion lagging 180 degrees out of phase with said first station, and a fourth welding station oscillates in simple harmonic motion lagging 270 degrees out of phase with said first station.

12. A welding machine for providing a plurality of spaced resistance welds through abutting metal sheets along a plurality of straight, parallel lines while said metal sheets move uninterruptedly in fixed relation to each other along a conveyer line, said machine having four ailgned frames positioned along said conveyer line, each frame having an opening through which said conveyer line extends, each frame having at least one vertically and laterally adjustable wheel electrode secured to its top and at least one corresponding vertically and laterally adjustable wheel electrode secured to its bottom, said wheel electrodes being adapted to be in peripheral contact with one of said metal sheets, support means for guiding said metal sheets in uninterrupted movement through said machine, means for oscillating each frame alternately in a forward and reverse direction along said conveyer line whereby at least a portion of the forward frame movement occurs substantially at the speed of movement of said metal sheets along said conveyer line, said wheel electrodes, during said portion of forward frame movement being in substantially fixed relation to said metal sheets, drive means for moving pairs of said frames in opposed directions during said oscillating, and electrical means for firing each pair of wheel electrodes solely during said portion of forward frame movement for a sufficient period of time to fuse said abutting metal sheets between said pairs of wheel electrodes.

13. The welding machine of claim 12 wherein said electrical means for firing includes a transformer spaced from said frames having a primary winding associated with a source of electrical power and a secondary winding connected by movable electrical conductors to said wheel electrodes.

14. The welding machine of claim 12 wherein said electrical means for firing includes two transformers associated with but spaced apart from each frame, each transformer having a primary winding associated through primary electrical conductors with a source of electrical power and a secondary winding connected by movable electrical connectors within one frame with two wheel electrodes of different pairs in peripheral contact with the same metal sheet, and means in said primary electrical conductors for passing electrical energy through said primary winding solely during said portion of forward frame movement.

15. A welding machine for providing a plurality of spaced resistance welds through abutting metal sheets along a plurality of straight parallel lines while said metal sheets move uninterruptedly in fixed relation to each other along a conveyer line, said machine having four aligned frames positioned along said conveyer line, each frame having an opening through which said conveyer line extends, each frame being pivotal about a horizontal axis perpendicular to and spaced from said conveyer line, each frame having at least one vertically and laterally adjustable wheel electrode secured to its top and at least one corresponding vertically and laterally adjustable wheel electrode secured to its bottom, adjustment means for securing said wheel electrodes in peripheral contact with one of said metal sheets, support means for guiding said metal sheets in uninterrupted movement through said machine, means for oscillating each frame pivotally about said horizontal axis alternatively in a forward and reverse direction whereby at least a portion of the forward movement of said wheel electrodes occurs substantially at the speed of movement of said metal sheets along said conveyer line, said wheel electrodes, during said portion of the forward movement being in substantially fixed relation to said metal sheets, pairs of said frames being adapted for pivotal movement in opposed directions during said oscillating, and electrical means for firing each pair of wheel electrodes solely during said portion of the forward movement for a sufficient period of time to fuse said abutting metal sheets between said pair of wheel electrodes.

16. A welding machine according to claim 15 wherein said horizontal axis is positioned beneath said conveyer line.

17. A welding machine according to claim 15 wherein opposed pinch rolls are provided between each of said frames, said pinch rolls being adapted for peripheral contact with said metal sheets to drive the said metal sheets through the said machine.

18. The method of securing abutting metal sheets by means of a plurality of spaced resistance welds along a plurality of straight lines which comprises passing said abutting metal sheets uninterruptedly along a conveyer line in fixed relation to each other, contacting said metal sheets successively with pairs of electrode wheels whereby each electrode wheel of each said pair contacts one of said metal sheets, oscillating each said pair of electrode wheels as a unit in a forward and reverse direction so that at least one pair of welding electrodes moves in a forward direction while another pair moves in a reverse direction, passing a resistance welding electrical current between a pair of said electrode wheels through said abutting metal sheets while the said electrode wheels are moving in a forward direction at substantially the speed of movement of said metal sheets along the said conveyer line.

19. The method of securing abutting metal sheets by means of a plurality of spaced resistance welds along at least four straight lines which comprises passing said abutting metal sheets uninterruptedly along a conveyer line in fixed relation to each other, contacting said metal sheets successively with at least four pairs of electrode wheels whereby one electrode wheel of each said pair contacts one of said metal sheets, oscillating each of said pairs of electrode wheels in a forward and reverse direction in simple harmonic motion whereby one of said pairs reaches a relative cyclic position every quarter cycle of movement and thus two pairs move at all times in opposed directions, passing a resistance welding electrical current between a pair of said electrode wheels through said abutting metal sheets while the said pair is moving in a forward direction at substantially the speed of movement of said metal sheets along the said conveyer line whereby electrical current is passed through no more than one of said four pairs of electrode wheels at any time.

References Cited in the file of this patent

UNITED STATES PATENTS

| | | |
|---|---|---|
| 2,065,546 | Young et al. | Dec. 29, 1936 |
| 2,126,453 | Criley et al. | Aug. 9, 1938 |
| 2,163,930 | Beiderman | June 27, 1939 |
| 2,404,632 | Hansen | June 23, 1946 |